April 19, 1938. W. A. PATRICK, JR 2,114,314
PROCESS OF TREATING OILS AND DISTILLATES THEREOF
Filed Jan. 17, 1934
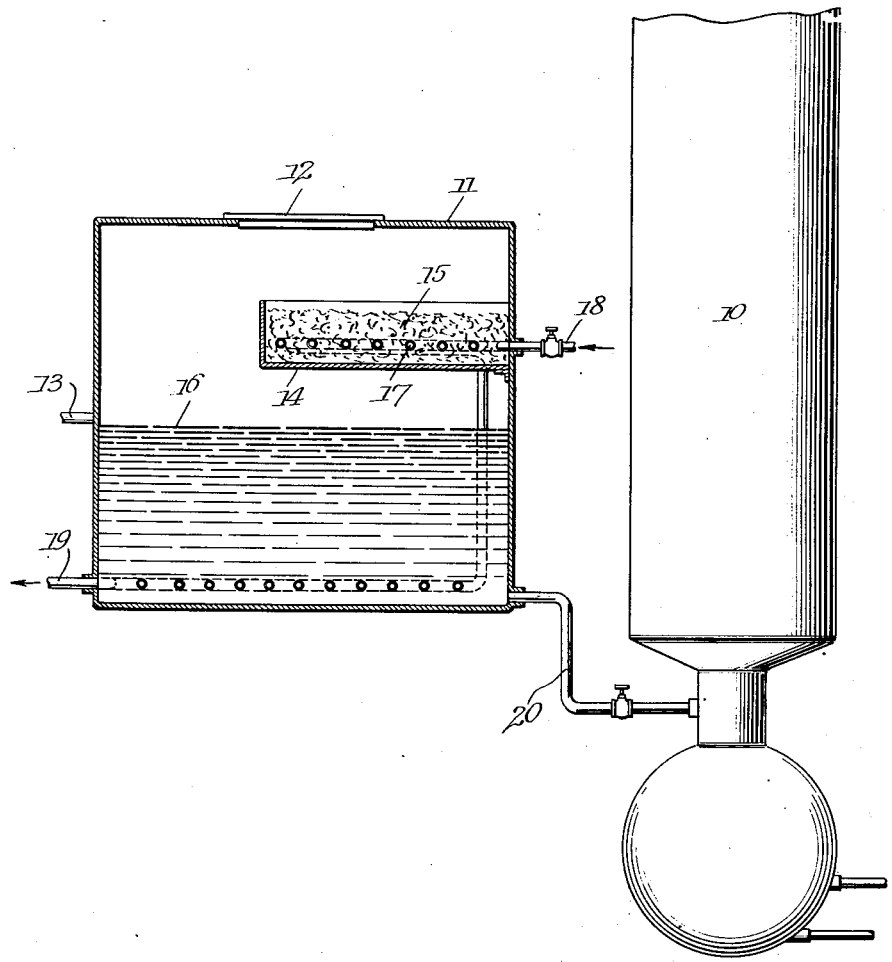
Inventor
Walter H. Patrick Jr.
By Cushman Darby & Cushman
Attorneys Patented Apr. 19, 1938

2,114,314

UNITED STATES PATENT OFFICE 2,114,314

PROCESS OF TREATING OILS AND DISTILLATES THEREOF

Walter A. Patrick, Jr., Mount Washington, Md.

Application January 17, 1934, Serial No. 707,008

9 Claims. (Cl. 196—42)

The present invention relates to the chemical treatment of oils, and in its primary application, the invention comprehends the purification of petroleum hydrocarbons, coal tar hydrocarbons, such as crudes, distillates, products from cracking, as well as oils derived from the processing of shales and the hydrogenation of coal, mineral oils and coal tar products.

In spite of much effort and study the method almost universally used to bring about the desired refining of nearly all petroleum and coal tar products, is that suggested in 1885 by Silliman—treatment with concentrated sulphuric acid followed by washing with sodium hydroxide solution. The objections to the sulphuric acid wash are generally recognized, but no suitable refining substitute has as yet been made available.

The present invention has as an object to provide an improved refining process and a superior product without recourse to the conventional sulphuric acid treatment.

In connection with the treatment of petroleum and petroleum products, I aim to produce, for example, gasoline, lubricating oils and kerosene by a method affording a product substantially free from deleterious substances, such as those which are easily oxidizable or otherwise unstable as well as resins and asphaltic materials and sulphur impurities or compounds. The presence of such substances in the oils or distillates is generally recognized as impairing the quality of the product.

With respect to the treatment of commercial distillates from light oil, for example, I have developed a novel process and product which is distinguished from the usual chemically treated commercial light oil distillates in that it is characterized (1) by the presence of valuable aliphatic constituents of the light oils and (2) by being likewise substantially free of deleterious substances such as unstable aliphatics and sulphur compounds and impurities.

In my copending applications Serial No. 616,166, filed February 17, 1933 and Serial No. 663,414, filed March 15, 1933, I have described a process of chemically treating petroleum products and coal tar derivatives such as light oils with sulphur chloride and the improved products obtained therefrom.

Stated briefly, the present invention comprehends the chemical treatment described in said applications of hydrocarbons and hydrocarbon mixtures in liquid phase, having for its fundamental purpose the removal therefrom of deleterious substances which impair the final product, i. e., gums, resins, aliphatic materials, sulphur impurities, easily oxidizable, and unstable compounds. These objectionable substances are formed into relatively stable bodies and are rendered separable from the oil as by distillation.

I have discovered, moreover, that by carrying out this chemical purifying treatment as a separate step prior to introducing the oil to the still that it is possible to eliminate and render innocuous a considerable portion of the noxious and corrosive gases, as well as other volatiles which themselves would impair the product or combine with the oil to do so. That is to say, volatiles including corrosive compounds such as H₂S and polymers thereof, chlorine, hydrochloric acid and various sulphur compounds which are produced by the reaction or may be formed during distillation are substantially all removed before the oil is distilled.

I carry out this preliminary removal of volatiles with the aid of a fixing or absorbing agent and preferably without contacting the agent with the liquid phase hydrocarbons. Numerous agents may be used, for example, lime or other alkaline earth oxides. By reason of this preliminary treatment, efficiency in the distillation treatment and an enhanced quality of product is obtained. In referring to the use of a chemical absorbent and reactive compound, disposed out of contact with the body of oil, I have ascertained that with some installations if the agent for example, an alkali, were presented in the path of the vapor stream from the still, that various combinations take place whereby corrosive and noxious compounds are produced and furthermore reaction products are formed which are returned to the oil or carried over with the distillate and impair the final product.

In my preferred process the oil is preliminarily treated with the sulphur chloride in a separate closed chamber at a temperature and pressure sufficient to approximate the distillation conditions to which the oil will be subsequently subjected. Disposed within the chamber and preferably out of contact with the oil, i. e., above the oil level, is a suitable alkali or other absorbent or reactive compound for the gases produced, which compound is positioned so as to come in contact or be in the path of volatiles produced by the reaction. Stated briefly, I accomplish as a segregated operation, reaction of the sulphur chloride and the oil with consequent formation of precipitatable and volatile deleterious compounds whereby the objectionable gaseous substances or the liquid phase products, as well, if desired are removable prior to distillation.

The oil to be treated will be passed to the treating chamber and the sulphur chloride in liquid or vapor phase will be mixed with the oil under conditions to insure the desired reaction. The deleterious vapors and volatile compounds produced, will be removed and fixed or absorbed by the alkali. Thereafter the oil will be passed to the usual still and preferably there separated from the heavy or precipitated undesirable compounds by distillation.

There are a number of ways in which sulphur chloride may react with saturated or unsaturated hydrocarbons. The preferred reaction results in the elimination of hydrochloric acid and the subsequent polymerization of the unsaturated hydrocarbons with the active sulphur of the sulphur chloride. However, there are instances where too much sulphur chloride is employed or the reaction is too greatly accelerated by heat, and some of the sulphur chloride may react to form various compounds containing sulphur and/or chlorine. Again, under certain conditions polysulphides of hydrogen sulphide or polythionic acids may be formed. These bodies are objectionable inasmuch as they decompose during the distillation of the oil, thereby introducing free sulphur in the distillate which aside from its deleterious properties combines with constituents of the oil in forming color compounds.

Hence, as above stated, I have discovered that if the oil to be refined is first chemically treated by heating it in contact with the sulphur halide to the maximum temperature of the subsequent distillation and in a closed vessel which contains lime (CaO) or other solid alkali disposed above the oil level, the above mentioned objectionable compounds of sulphur, hydrochloric acid and free chlorine are absorbed in gaseous phase and fixed by the alkali, and thus permanently removed. It is essential that the alkali be not allowed to come into contact with the liquid mixture of oil and sulphur chloride. If the latter were to occur, the free sulphur chloride or even the addition compound of the same with the hydrocarbons would be decomposed with resultant formation of free sulphur.

The preferred method of using sulphur chloride to free an oil of the various deleterious constituents is to heat the oil with the minimum amount of sulphur chloride necessary to remove the gum, resins and other objectionable compounds, as set forth in my said copending applications. With the present invention this purifying treatment takes place in a closed vessel at a temperature sufficiently high to cause the volatile sulphur compounds, polymers thereof and thionic acids to combine with the alkali disposed above the oil level and in the path of the various vapor phase substances produced. In this connection the free chlorine and hydrochloric acid gas produced will likewise be absorbed or react with the alkali or other agent and hence be removed. Subsequent distillation of this reaction mixture freed of undesirable volatiles results in the production of a water white oil free of all objectionable gum forming and other deleterious constituents.

As one example, I take crude petroleum naphtha and treat it in a closed chamber with one per cent or less by volume of sulphur chloride, heating the mixture up to a temperature of substantially 200° C. for one hour. At the end of this period it will be observed that the lime or other fixing agent disposed above the oil level will have absorbed the hydrochloric gas, free chlorine gas and the various sulphur compounds, volatile within the distillation range of the oil, namely up to substantially 200° C. Furthermore, it will be found that by absorbing or reacting such gases with a suitable agent, for example the alkali, any possibility of recombining of such gases with the oil and the return of objectionable compounds is eliminated.

Equally effective results are obtained in the case of coal tar hydrocarbons by similarly treating raw light oil, for example in a closed chamber with three per cent by volume or less of sulphur chloride and heating for one hour up to 150° C., this being the normal distillation temperature of the oil.

In each case the oil removed from the chamber and subsequently distilled is of enhanced quality and free from any deleterious substances or color compounds. Furthermore, since the noxious and corrosive gases have been removed, the equipment is not subjected to any deteriorating influences. In this connection the chemically treated oil before it is delivered to the still may be subjected to a filtration or separation step whereby the heavy ends and solids are removed.

In the accompanying drawing, I have illustrated diagrammatically one means for carrying out the chemical treatment of petroleum hydrocarbons and coal tar hydrocarbons in accordance with the present invention.

I have indicated at 10 a suitable still, for example one similar to that illustrated in my aforesaid applications, and associated with this still is the preliminary oil treating chamber 11. This chamber, as shown, is closed, being provided with a suitable cover 12 to permit access to the interior, and may also have suitable sight openings not shown. The oil to be treated is passed to the still through the inlet 13 from any suitable source of raw material, for example from storage tanks usually available at refineries. Disposed in the chamber and supported thereby is an open top receptacle 14 positioned above the normal oil level in the chamber 11. This receptacle 14 is provided for holding the fixing agent or absorbing means, such as alkali, and the receptacle may be of any desired size or shape, and is positioned so as to be in the path of volatiles produced during the treatment of the oil. The fixation agent disposed in the receptacle 14 is shown at 15, and the oil is shown at 16, and passing through the receptacle 14 and through the oil is a heating means in the form of a continuous pipe or coil 17. As shown, the coil 17 will contact with the fixing agent as well as be immersed in the oil. I have found that preferably, although not necessarily, by keeping the treating agent 15 in heated condition and at a temperature not varying substantially from that of the oil, that it acts to very efficiently absorb or combine with and fix the various volatiles which it is desired to eliminate. The heating medium supplied to the coils 17 may be steam, hot water, or other fluid, and is introduced at 18 and passes out of the chamber 11 at 19. After the oil in the chamber 11 has been satisfactorily treated, it is preferably removed as by gravity or pumped from the chamber 11 to storage or directly to the still 10 through the pipe 20.

The process may be carried out as a continuous one in that the oil will be treated in the chamber 11 and then passed to a suitable storage receptacle from which it will be withdrawn to the still 10. Where the oil is drawn directly from the chamber 11 to the still 10, it is at a temperature substantially approaching the distillation temperature and hence a considerable fuel economy is obtained incident to the distillation step. Likewise, where the oil is first passed to a storage receptacle, this may be provided with a heating means to promote a similar economy.

As will be observed, the present invention is to be distinguished from that described in my aforesaid applications in that I now provide a separate preliminary treatment of the oils before they are passed to the distillation apparatus. That is, the purifying reaction with sulphur chloride is carried out and undesirable volatiles removed simultaneously by a segregated step. The chemically treated oil is thereafter conveyed from the treating compartment to the still.

The principle of my method consists in treating the impure hydrocarbons which are introduced into the chamber 11 with sulphur chloride with or without the presence of a catalyst so as to produce a reaction between the actual and/or potential gum forming constituents and the sulphur chloride. These gum forming constituents are changed into a gummy or tarry product substantially stable and not appreciably volatile at distillation temperatures whereby the deleterious compounds are rendered separable from the oil. Simultaneously with the stabilizing of the gummy bodies the objectionable gaseous bodies are removed.

The oil to be chemically treated is introduced into the chamber 11 and the temperature thereof and the operation time period is controlled so that optimum reaction takes place. The volatiles formed incident to the reaction, such as deleterious sulphur compounds, hydrochloric acid gas, free sulphur and complex vapors are absorbed or fixed by the alkali so that (1) these compounds cannot return to the oil and (2) the oil being freed of them, distillation may take place without fear of corrosion of the apparatus or any recombination of the oil with the undesired substances such as would impair the final product.

Briefly then, the process of the present invention comprehends the purification of the oil by an instrumentality separate from the still, in which reaction conditions substantially similar to those described in my aforesaid applications are presented, and the objectional volatiles are efficiently removed from the oil and the undesired liquid or solid constituents are at the same time rendered stable and separable.

Many halides of metals and metaloids have been suggested as refining reagents of petroleum and coal tar products, notably $AlCl_3$, $ZnCl_2$ and $FeCl_3$, and others such as $AsCl_3$, $SbCl_3$, $SnCl_4$ have also been mentioned. Their use was directed either to cracking or to cause the complete removal of unsaturated aliphatic hydrocarbons. The halides of sulphur are milder polymerizing agents than the metallic chlorides, making it possible to select conditions that will result in only the elimination of objectionable constituents of the oil.

I have discovered that a sulphur halide, preferably sulphur mono-chloride ($S_2Cl_2$), properly regulated under suitable reaction conditions, constitutes a highly effective refining agent and may be employed as a substitute for the conventional sulphuric acid treatment.

The sulphur halide which I have most successfully employed is the mono-chloride ($S_2Cl_2$). But the di-chloride and tetrachloride of sulphur are also useful. Obviously, the same result may be obtained by using other reagents which react to form a sulphur halide.

The amount of sulphur chloride must be determined within reasonable limits, and I find that with the present invention, any slight excess is not disturbing in that the presence of the alkali fixing agent readily takes care of any sulphur, sulphur compounds, chlorine or chlorine compounds, as well as any complex volatile reaction products due to the nature of the oil or treatment of the oil with the sulphur chloride.

The exact quantity of the reagent can be determined for example, by adding small percentages of the same to the oil to be refined, refluxing for a short time, and then subjecting the mixture to distillation. The purity and other characteristics of the distillate will enable one to quickly ascertain the requisite amount of the reagent for the oil.

In this connection the chamber 11 may be provided with means for accomplishing the refluxing and distillation treatment, or this testing of the oil to determine the proper amount of reagent may take place upon any sample of the oil.

Moreover, all hydrocarbon oils do not show the same velocity of reaction with the reagent. It is, therefore, necessary to determine the length of the treatment with each variety of oil. This reaction velocity is dependent upon temperature, the nature of the oil to be refined, the concentration and composition of the sulphur chloride, and where a catalyst is employed, the nature of the catalyst.

I have found that ordinarily the sulphur chloride should be used in relatively small percentages, usually less than 1% in the case of petroleum products such as naphthas, and from less than 1% to possibly 3% in the case of light oils and coal tar hydrocarbons. The reaction between the sulphur halide and the oil may, in some cases, be accelerated by a catalyst, such as finely divided clay or fuller's earth, copper, lead, zinc, and finely divided anhydrous sulfides, lead, tin, arsenic and antimony. The reaction can take place in the cold, but ordinarily heat will reduce the time period.

The reaction is characterized by (1) there is no chlorination of the valuable aliphatic and aromatic compounds so that addition or substitution chlorinated products of the valuable hydrocarbons are not formed; (2) the potential gum forming constituents or unstable aliphatics of the oil are reduced or condensed or polymerized to form separable bodies which are insoluble or are but slightly soluble, i. e., of reduced solubility in the oil, and which have a boiling point above that employed for distillation so that the valuable constituents of the oil are removable by distillation; (3) hydrochloric acid gas, free chlorine, volatile sulphur compounds and other complex volatiles are formed and immediately eliminated by the fixation agent, and (4) the sulphur chloride reacts upon the potential gum forming constituents and sulphur compounds of the oil and is in such small percentage that no opportunity is afforded for the formation either of an increase of sulphur impurities, or objectionable chlorinated products, both of which would impair the final product. That is to say, the reaction of the sulphur chloride is controlled so that it acts to reduce the solubility of the liquid and solid phase deleterious substances in the oil and form them into separable relatively stable heavy bodies having a boiling point above the normal distillation temperatures while the simultaneously formed objectionable gaseous bodies are separated and removed.

My improved process has numerous advantages as compared to the conventional sulphuric acid treatment to which there are objections so generally recognized that they need not be discussed. From the standpoint of yield, the recovery of the valuable and useful hydrocarbons is materially increased, as compared to a sulphuric acid or chlorinating treatment. The increased yield is equal to the amount of the valuable unsaturated hydrocarbons, aliphatics, and/or aromatic hydrocarbons which are usually destroyed by sulphuric acid treatment, or chlorinating. The sulphur chloride is relatively inexpensive and the simplicity of the process reduces the refining expense, having in mind particularly that only small percentages of sulphur chloride are employed. The amount of the gum or tarry residue obtained is considerably less than the sludge produced by the acid or chlorine treatment. Further, the handling of large quantities of sulphuric acid or unstable chlorine with attendant problems is avoided.

The oil in the chamber 11 is heated to a temperature of approximately 150° F. in the case of light oils, for example, while in the case of crude petroleum naphthas the temperature is usually elevated to substantially 200° C. At these temperatures the reaction takes place with or without the presence of a catalyst. It is to be noted that the fixing agent or alkali disposed above the oil level is simultaneously heated and that the temperature of the alkali mass will be substantially that imparted to the oil. The continuous heating means preferably passes first through the alkali so that the same is rendered highly reactive and absorbent either immediately prior to or simultaneously with the elimination of volatiles from the oil.

The chemical action which takes place, I believe to be (1) a combining of the sulphur chloride with the gum forming and sulphur compound constituents of the oil with liberation of hydrochloric acid gas and volatile sulphur compounds and (2) the changing by polymerization of the unstable and readily soluble deleterious compounds into definite relatively stable bodies which are high boiling, separable, i. e., stable above usual distillation temperatures and less soluble in the oil.

The $S_2Cl_2$ is used in amount to react with the deleterious substances present, but in insufficient amount to attack the valuable aliphatic and aromatic hydrocarbons under the conditions of reaction. The reaction conditions, such as time period, temperature and pressure, and quantity of sulphur monochloride and/or catalyst are controlled to produce the desired result. Stated again, the desirable hydrocarbons are not affected, but the substances, such as gums, resins, tars, and sulphur compounds are changed or stabilized or formed into polymerized compounds which, upon distillation, are separable as a residue or into volatiles which are absorbed by the fixing agent.

The reaction proceeds with formation of hydrochloric acid gas, volatile sulphur compounds and complex gaseous bodies which as liberated are absorbed by the fixation agent. The oil under treatment, usually yellow, turns a dark or black color and a heavy precipitate forms comprising the gums, resins, and reaction compounds, together with free sulphur. It is noted that the heavy precipitate is much less in quantity than the "sludge" or "tar" formed when a sulphuric acid wash or chlorine treatment is employed.

Upon completion of the treatment the oil comprises a precipitate which is stable and high boiling, i. e., above the normal distillation temperature of the oil. The oil possesses a temperature approximating that required for its distillation and may therefore be immediately run into the still and subjected to the distilling operation. Again, the oil may be run to a suitable storage vessel preferably heated, but not necessarily so, whence the treatment may be made continuous.

The oil so treated is now distilled and this is satisfactorily accomplished in any suitable fractionating tower in the usual manner. The temperatures employed will be determined by the oil under treatment, and, if desired, the distillation may be accomplished under reduced pressure and/or condensing means disposed intermediate the tower or at the outlet thereof for returning certain fractions back to the chamber. Likewise, various of the fractions may be condensed and collected from the tower, i. e., separate fractions may be taken off.

The distillate recovered by the present method is remarkably free of gums and resins as well as sulphur compounds, such as mercaptans, polysulphides and other sulphur impurities. Likewise, the product is free of hydrochloric acid and chlorine and chlorine compounds.

With respect to the distillation treatments, I will follow those described in my aforesaid applications, using conditions best suitable for the particular oil under treatment.

In some cases the oil delivered from the reaction chamber 11 will include the heavy precipitate, whereas in other cases this may be separated out by filtration prior to introduction into the still. It is to be understood, however, that the preliminary separation of the heavy ends is not essential to the operation of the present invention, since these heavy end products are stable and have a boiling range above that of the normal boiling range of the oil.

The present invention is applicable in the treatment of practically all types of petroleum products and coal tar products whether crude or refined and finds particular utility with oils which under normal conditions would have a tendency to corrode the apparatus. It is also useful in the treatment of products obtained from the hydrogenation of coal, mineral oils and coal tar products. It is recognized that certain refinery installations present conditions more susceptible to corrosion influences than others and the present invention is particularly useful in such cases and in cases where the distillation equipment does not permit of reasonably accurate control of the sulphur chloride reaction.

The oil after treatment with sulphur chloride may be given the customary alkali wash, if necessary, or the distillate may be given such treatment.

In the appended claims, I intend the term "oils" to include either petroleum and its derivatives, or coal tar hydrocarbons and derivatives of the same or products obtained by hydrogenation. Likewise, in describing the permanent removal of the gaseous phase deleterious bodies, I mean their elimination from the oil so that they cannot either combine therewith or in any manner return to the oil.

Various modifications may be resorted to, all of which are considered to be comprehended within the scope of the claims.

I claim:

1. The process of chemically treating oils and distillates thereof to obtain products free of easily oxidizable or otherwise unstable substances as well as resins or asphaltic materials and sulphur impurities which comprises reacting with sulphur halide upon the deleterious materials in the oil and forming them into gaseous phase bodies and high boiling relatively stable liquid and solid phase compounds of reduced solubility, simultaneously permanently removing the gaseous substances from the oil by contact with means disposed in a separate zone from the oil, said means being an alkaline fixation agent, and separating the oil from the high boiling compounds.

2. The process of chemically treating oils and distillates thereof to obtain products free of easily oxidizable or otherwise unstable substances as well as resins or asphaltic materials and sulphur impurities which comprises reacting with a sulphur halide upon the deleterious materials in the oil and forming them into gaseous phase bodies and high boiling relatively stable liquid and solid phase compounds of reduced solubility, simultaneously permanently removing the gaseous substances from the oil by contact with means disposed in a separate zone from the oil, said means being an alkaline fixation agent, and distilling the oil to separate the same from the high boiling compounds.

3. The process of chemically treating oils and distillates thereof to obtain products free of easily oxidizable or otherwise unstable substances as well as resins or asphaltic materials and sulphur impurities which comprises reacting with a sulphur chloride upon the deleterious materials in the oil and forming them into gaseous phase bodies and high boiling relatively stable liquid and solid phase compounds of reduced solubility, simultaneously permanently removing the gaseous substances from the oil by means disposed in a zone separate from the oil, said means being an alkaline fixation agent, and separating the oil from the high boiling compounds.

4. The process of chemically treating oils and distillates thereof to obtain products free of easily oxidizable or otherwise unstable substances as well as resinous or asphaltic materials and sulphur impurities which comprises reacting with a sulphur halide upon the deleterious materials in the oil in the presence of an alkaline fixation agent disposed above the oil level but in the path of volatiles produced by the reaction, and forming such deleterious materials into gaseous phase bodies and high boiling relatively stable liquid and solid phase compounds of reduced solubility, permanently removing the gaseous substances from the oil by contact with said fixation agent, and separating the oil from the high boiling compounds.

5. The process of chemically treating oils and distillates thereof to obtain products free of easily oxidizable or otherwise unstable substances as well as resins or asphaltic materials and sulphur impurities which comprises reacting with a sulphur halide upon the deleterious materials in the oil in the presence of a catalyst and forming them into gaseous phase bodies and high boiling relatively stable liquid and solid phase compounds of reduced solubility, simultaneously permanently removing the gaseous substances from the oil by means disposed in a separate zone from the oil, said means being an alkaline fixation agent, and separating the oil from the high boiling compounds.

6. The process of chemically treating oils and distillates thereof to obtain products free of easily oxidizable or otherwise unstable substances as well as resins or asphaltic materials and sulphur impurities which comprises reacting with a sulphur halide upon the deleterious materials in the oil in the presence of a fixation agent disposed in a separate zone above the oil level for volatiles produced by the reaction and at an elevated temperature in a closed chamber and forming them into gaseous phase bodies and high boiling relatively stable liquid and solid phase compounds of reduced solubility, permanently removing the gaseous substances from the oil by contact with said agents, and separating the oil from the high boiling compounds.

7. The process of chemically treating oils and distillates thereof to obtain products free of easily oxidizable or otherwise unstable substances as well as resins or asphaltic materials and sulphur impurities which comprises reacting at elevated temperature in a closed chamber with a sulphur halide upon the deleterious materials in the oil and in the presence of a solid fixation agent disposed out of contact with the oil but in the path of vapors evolved therefrom during the reaction, and forming the deleterious materials into gaseous phase bodies and high boiling relatively stable liquid and solid phase compounds of reduced solubility, permanently removing the gaseous bodies by contact with the fixation agent, passing the treated oil to a still, and distilling the oil containing said stable liquid and solid phase compounds to separate the oil therefrom.

8. The process of chemically treating oils and distillates thereof to obtain products free of easily oxidizable or otherwise unstable substances as well as resins or asphaltic materials and sulphur impurities which comprises reacting with about 1% of a sulphur halide upon the deleterious materials in the oil and forming them into gaseous phase bodies and high boiling relatively stable liquid and solid phase compounds of reduced solubility, permanently removing the gaseous substances from the oil by means disposed in a separate zone from the oil, said means being an alkaline fixation agent, and in the path of said gaseous substances, and separating the oil from the high boiling compounds.

9. The process of chemically treating oils and distillates thereof to obtain products free of easily oxidizable or otherwise unstable substances as well as resinous or asphaltic materials and sulphur impurities which comprises reacting with about 1% of a sulphur halide upon the deleterious materials in the oil in the presence of a fixation agent disposed in a separate zone from the oil, said means being an alkaline fixation agent, but in the path of volatiles formed therefrom, and forming such deleterious materials into gaseous phase bodies and high boiling relatively stable liquid and solid phase compounds of reduced solubility, permanently removing the gaseous substances from the oil by contact with said fixation agent, and separating the oil from the high boiling compounds.

WALTER A. PATRICK, JR.